Nov. 17, 1959  A. H. GERBAUD  2,912,947
ELECTRIC POWER SYSTEM FOR SEWING MACHINES
Filed May 21, 1957  6 Sheets-Sheet 2
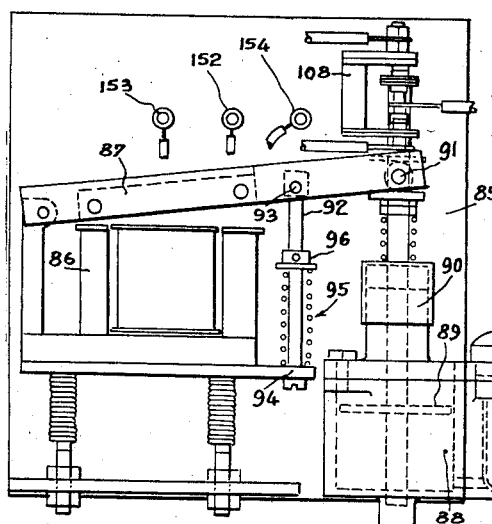
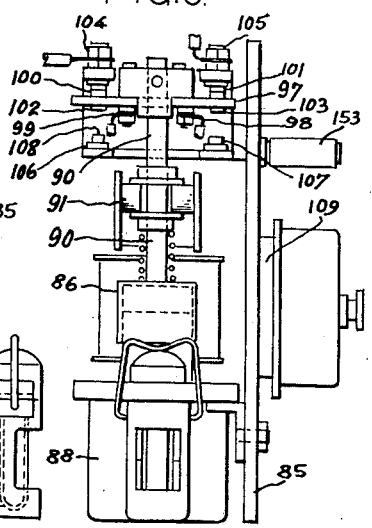
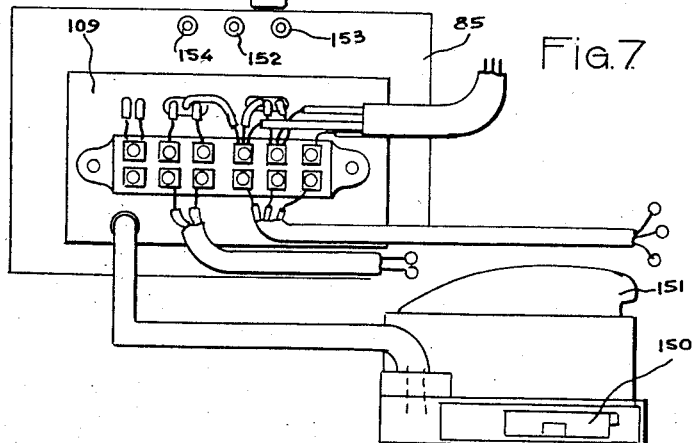
INVENTOR
AUGUSTE H. GERBAUD
BY Nov. 17, 1959        A. H. GERBAUD        2,912,947
ELECTRIC POWER SYSTEM FOR SEWING MACHINES
Filed May 21, 1957                        6 Sheets-Sheet 3
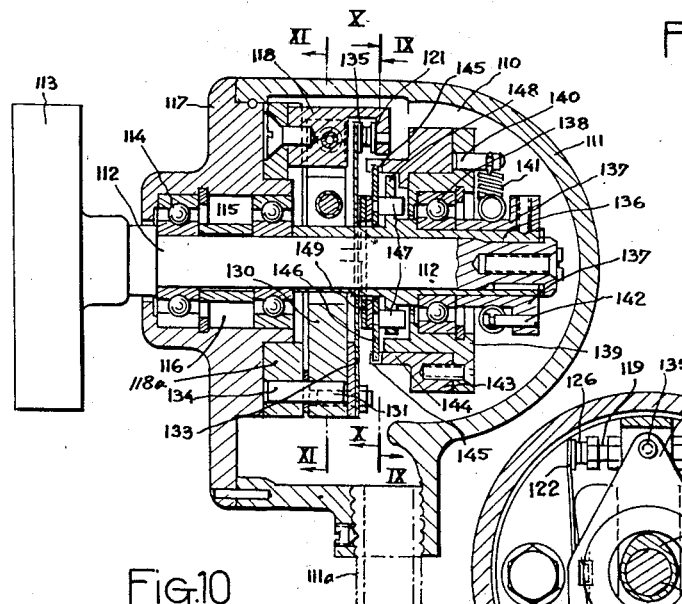
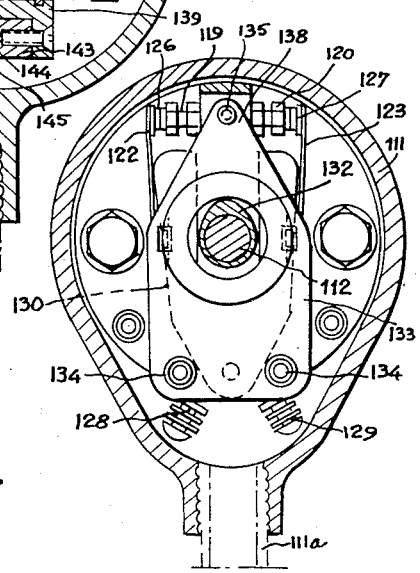
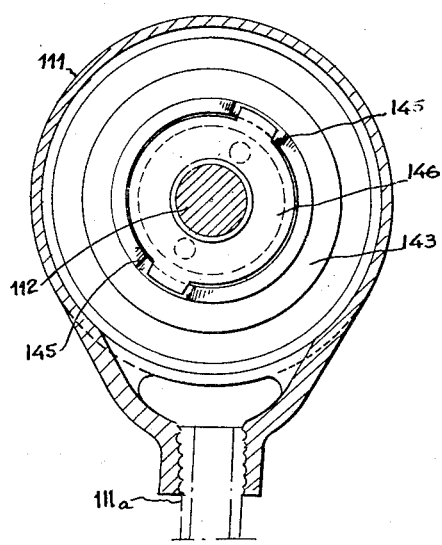
INVENTOR
AUGUSTE H. GERBAUD Nov. 17, 1959  A. H. GERBAUD  2,912,947
ELECTRIC POWER SYSTEM FOR SEWING MACHINES
Filed May 21, 1957  6 Sheets-Sheet 4

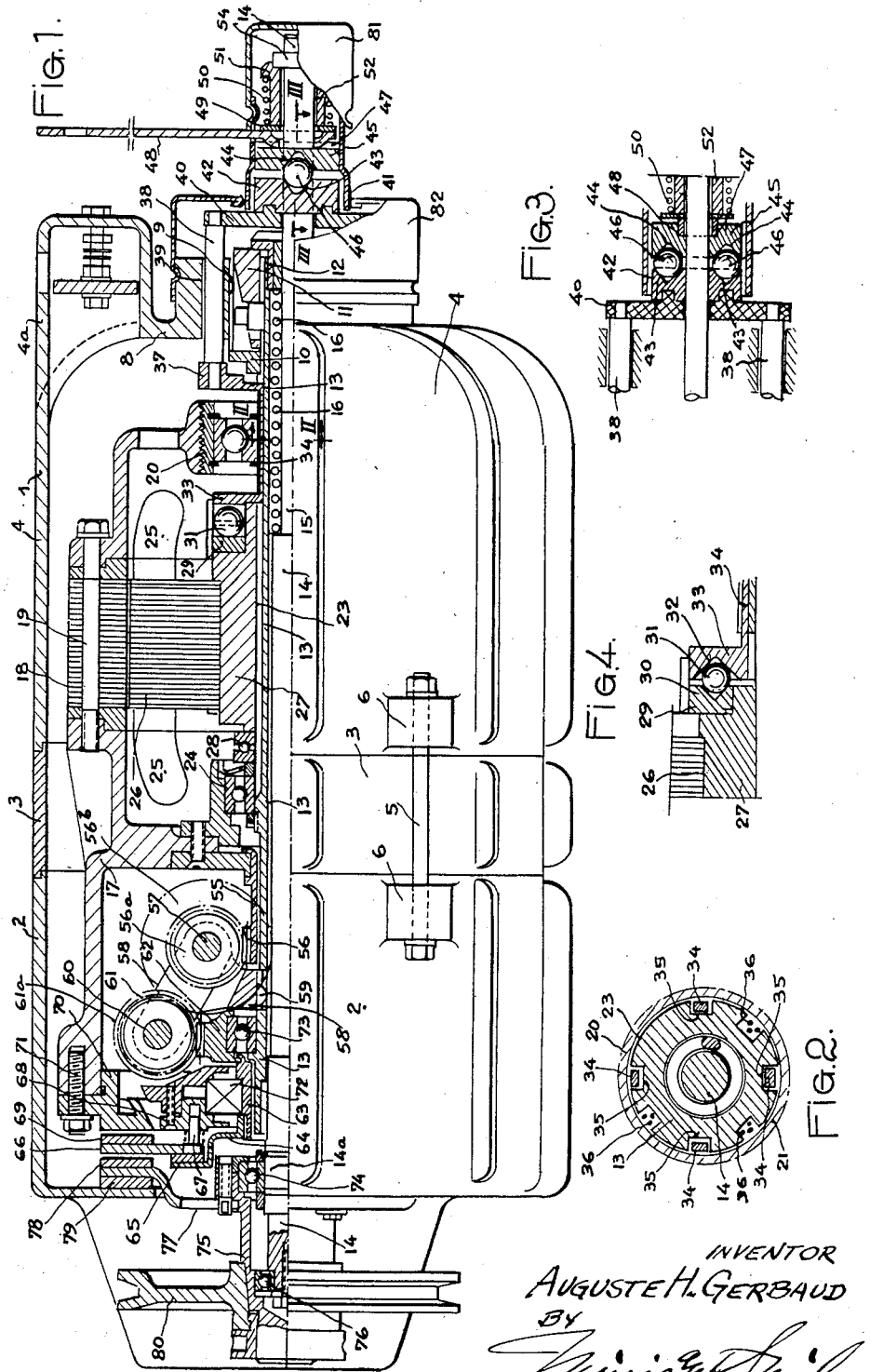

INVENTOR
AUGUSTE H. GERBAUD
BY

Nov. 17, 1959　　　A. H. GERBAUD　　　2,912,947
ELECTRIC POWER SYSTEM FOR SEWING MACHINES
Filed May 21, 1957　　　　　　　　　　　　6 Sheets-Sheet 5
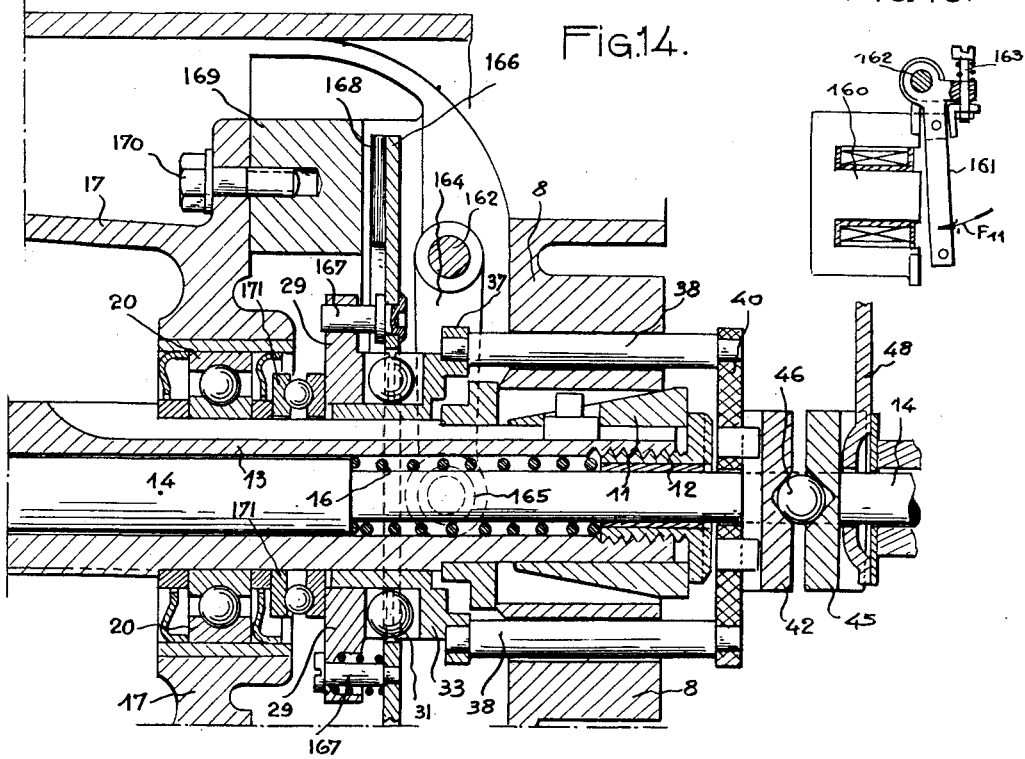
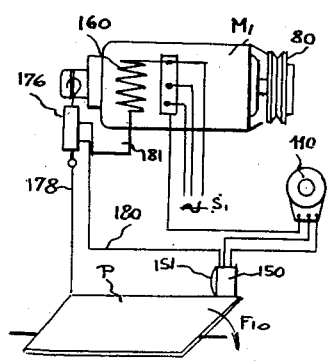
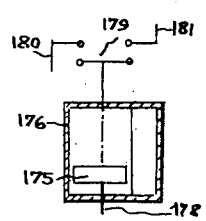
INVENTOR
AUGUSTE H. GERBAUD
BY Nov. 17, 1959  A. H. GERBAUD  2,912,947
ELECTRIC POWER SYSTEM FOR SEWING MACHINES
Filed May 21, 1957  6 Sheets-Sheet 6

INVENTOR
AUGUSTE H. GERBAUD
BY

United States Patent Office 2,912,947
Patented Nov. 17, 1959

2,912,947

ELECTRIC POWER SYSTEM FOR SEWING MACHINES

Auguste Henri Gerbaud, Paris, France

Application May 21, 1957, Serial No. 660,674

Claims priority, application France May 25, 1956

11 Claims. (Cl. 112—219)

The present invention relates to an electric power system for a sewing machine used for industrial or household purposes, affording at will high-speed rotation, stitch-by-stitch speed and the sudden stoppage of the sewing machine, by means of a single pedal.

This motor, which is of simple and practical design, combines the following properties: Low consumption added to high power when starting, stoppage of the needle of the machine at its top or bottom position, either automatically, or voluntarily by slight pressure on an electric contact, which is generally foot-controlled.

According to the invention, the body of the motor carries a hollow spindle on which the stator is placed, whereas the rotor is loosely mounted on bearings integral with the afore-mentioned spindle; the latter contains a shaft which can slide axially and on which is mounted, by means of ball bearings, the hub of the pulley transmitting movement to the sewing machine, this hub carrying the brake and main clutch discs, an intermediate clutch, controlled by reducing gear, co-operates with the main clutch for obtaining two rotation speeds for the sewing machine, one of the ends of the shaft carrying a change-over switch controlling two electric circuits feeding a member controlling the displacement of the sliding shaft so as to position the needle of the sewing machine either at top dead centre or bottom dead centre.

According to another characteristic of the machine, the body of the motor carries a hollow spindle on which a socket is threaded carrying the stator of the motor, whose rotor is loosely mounted on ball bearings integral with the afore-mentioned hollow spindle; this latter contains a shaft that can slide axially and on which is mounted, on the one hand, a brake and main clutch, and on the other hand, the hub of the pulley for transmitting movement to the sewing machine, a second clutch, driven by reducing gear, co-operates with the first clutch for obtaining two rotation speeds of the sewing machine, one of the ends of the shaft carrying a changeover switch controlling two electric circuits feeding a lagging relay controlling the displacement of a double contact ensuring the reversing of the passage direction of the current in the stator of the motor for positioning the needle either at top dead centre or bottom dead centre.

According to one feature of the invention, the selecting switch, comprising a double switch controlling the feed circuit of the lagged relay, is provided with an inertia wheel retarding the passage of the current between the double switch and the afore-mentioned relay.

According to other features of the invention: The relay is retarded by means of a dash-pot; the pedal controlling the main clutch of the motor carries a switch which controls, on the one hand, the circuit common to the change-over switch integral with the pedal, this switch opening as soon as it is pressed; on the other hand, the afore-mentioned change-over switch controls the two circuits of the current reverser placed on the sewing machine; a cam integral with the socket carrying the movable stator thrusts by means of balls, another cam which transmits the movement to the sliding shaft by means of connecting parts against the action of a spring which tends to bring the sliding shaft to its first position when the stator ceases to exert pressure on the cam; the stator is firmly mounted on a socket loosely adjusted on the hollow spindle, the lateral movement of the socket being limited in one direction by a ball bearing and in another direction by the members in contact with the afore-mentioned cam.

In a second embodiment, the stator is fixed and the rotary ball-race co-operates with a clutch carrying a cam controlled by an electro-magnet whose feed circuit is controlled on the one hand, by the change-over switch integral with one of the ends of the shaft of the sewing machine, and on the other hand, by the switch and current reverser integral with the pedal of the sewing machine, a dash-pot delaying the closing of a switch mounted in the feed circuit of the electro-magnet activating the clutch.

The movable armature of the electro-magnet, integral with a fork controlling the clutch, is returned to its neutral position as soon as the feed of the electro-magnet terminates, by a spring device.

Various other characteristics of the invention will be revealed by the detailed description which follows.

Forms of embodiment of the invention are shown, by way of examples, in the attached drawings.

Fig. 1 is an elevation-section of the electric power system.

Fig. 2 is a section on a larger scale, along the line II—II of Fig. 1.

Fig. 3 is a section on a larger scale, along the line III—III of Fig. 1.

Fig. 4 is a section on a larger scale of one of the members of the motor of Fig. 1.

Fig. 5 is a front elevation of a feed relay of the motor.

Fig. 6 is a side elevation corresponding to Fig. 5.

Fig. 7 is an elevation, on a smaller scale, of the rear face of the relay shown in Fig. 5.

Fig. 8 is an elevation-section of another element of the motor.

Fig. 9 is a section along the line IX—IX of Fig. 8.

Fig. 10 is a section along the line X—X of Fig. 8.

Fig. 14 is a partial elevation-section, on a larger scale, of an alternative embodiment of the motor.

Fig. 15 is an elevation-section, on a smaller scale, of one of the members of the motor of Fig. 14.

Fig. 16 is an electrical diagram of the wiring of the motor shown in Fig. 14.

Fig. 17 is a view, on a larger scale, of one of the members of the motor shown in Fig. 16.

Figure 11:
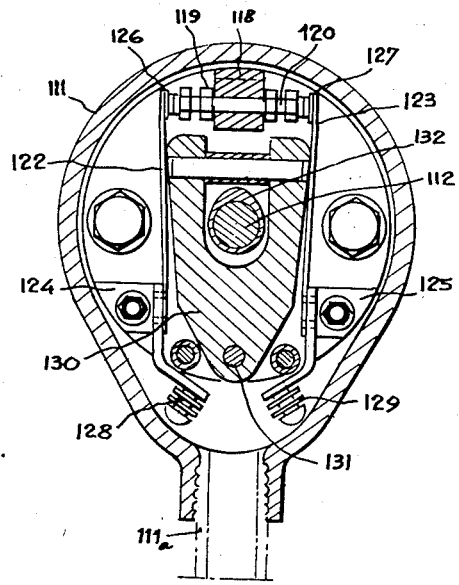
Fig. 11 is a section along the line XI—XI of Fig. 8.

In Fig. 1, the body 1 of the motor, which consists of three casings 2, 3, 4 connected to each other by rods 5 passing through holes drilled in bosses 6 cast on the casings 2 and 4, is intended to be fixed under the table of the sewing machine by means of a device not shown in the drawing.

At one of its ends, the casing 4 comprises a hollow extension 4a covered by a hood through which the feed conductors pass which are connected to the terminal plate of the motor. A boss 8 cast on to the end of the casing 4 is drilled in its middle with a conical hole 9 into which a centering cone 11 is inserted and locked by a nut 12 on which a hollow spindle 13 is threaded; see Fig. 14.

A shaft 14 is placed inside the hollow spindle 13. This shaft 14 comprises a reduced part 15. A spring 16 is housed inside the hollow spindle 13 and is interposed between the nut 12 and the shoulder-piece of the shaft 14 delimiting the reduced part 15.

A rotary casing 17, on which the set of magnetic armature plates 18 is fixed by means of a bolt 19, is centered, on the one hand, on a ball bearing 20 mounted on the periphery of the hollow spindle 13.

The other end of the rotary casing rests on a ball bearing 24 mounted on the hollow spindle 13. The stator winding 25 of the motor is fixed on the stator 26 resting on a bushing 27 centered on the hollow spindle 13. A ball bearing 28 is interposed between the ball bearing 24 and the bushing 27, whereas the other side of this bushing 27 is a cam 29 comprising two cavities 30 with a ball 31 engaging in each cavity, see Fig. 4.

The balls 31 also penetrate into cavities 32 a cam 33 which comprises four extensions 34 placed at 90° to each other. These extensions pass into the cutout portions 35 made in the hollow spindle 13. Several cutout portions 35 contain the feed conductors 36 conveying the current to the winding 25 of the stator.

The extensions 34 are integral with a crown 37 on which push-rods 38 are fixed passing through holes 39 drilled in the boss 8. The push-rods 38 carry a disc 40, in the middle of which a ring 42 is fixed.

Conical diametrically opposed cavities 43 are provided in the ring 42, whereas identical cavities 44 are provided in a second ring 45 concentric to the first one. The rings 42 and 45 act as cams.

46 designates the balls housed in the conical cavities 43, 44. The ring 45 has a diametrical slot 47 in which the lower end of a lever 48 is fitted and retained by a washer 49 thrust by a spring 50 bearing against a shoulder-piece 51 of a socket 52 locked on to the shaft 14 by a pin 54.

The interior of the rotary casing 17 is extended at its front part by a bushing 55 carrying teeth 56 co-operating with a pinion 56a keyed on a spindle 57 revolving in bearings fixed on a part 58 keyed at 59 on the hollow spindle 13. A second spindle 60 revolving in bearings carried by the part 58 carries the pinion 61 which meshes with the toothed crown 62 mounted on a bushing 63 carrying a crown 64 on to which a clutch element 65 is fixed. Two pinions 56b and 61a meshing with each other connect the pinions 56a and 61. A disc 66 is fixed by sliding catches 67 which act as connecting members for driving the disc. The catches 67 are held in holes drilled in a part 68 mounted on the bushing 63 by means of an overrunning clutch 72.

The disc 66 carries a clutch element 69 intended to co-operate with a ring 70 fixed by bolts 71 on the front end of the rotary casing 17.

An overrunning clutch 72 is interposed between the bushing 63 and the part 68. 73 designates a ball bearing interposed between the toothed crown 62 and the hollow spindle 13.

The unit formed by the teeth 56, the pinion 56a, the part 58, the pinion 61, the teeth 62, is referred to in the following part as the reducing gear device.

A ball bearing 74 mounted on the front end 14a of the shaft 14 carries a bushing 75 resting, by a ball bearing 76, on the end of the shaft 14. The bushing 75 is fixed, on the one hand to a disc 77 carrying two friction elements 78, 79, and on the other hand, to a grooved pulley 80 intended to receive the driving belt of the sewing machine.

81, 82 designate the protecting hoods of the various members of the motor.

The relay shown in Fig. 5, comprises a support-panel 85 on which there is fixed, on the one hand, the electro-magnet 86 to which its armature 87 is articulated, and on the other hand, a cylinder 88 in which a piston 89 is housed integral with a rod 90 connected at 91 to the armature 87 of the electro-magnet 86. A rod 92, pivoted at 93 on the armature 87, is able to slide across a hole 94 drilled in an extension of the electro-magnet 86.

95 designates a spring interposed between the extension of the electro-magnet and socket 96 mounted with the rod 92. The rod 90 carries an insulating plate 97 at its upper end, carrying, on the one hand, the terminals 98, 99, and on the other hand, the contacts 100, 101, 102, 103. Studs 104, 105, 106, 107 are fixed on two supports 108 insulated from the support-panel 85.

109 designates the junction box which will be referred to later on.

In Fig. 8, the device, referred to hereinafter as the selector 110, is placed in a casing 111 attached to the end of a flexible tube 111a secured by any suitable means to the table of the sewing machine.

The shaft 112 which is an extension of the shaft 113 of the sewing machine maintains ball bearings 114, 115 placed in a bearing 116 integral with a plate 117 carrying the casing 111. 118 designates an insulated support fixed on a ring 118a on which two studs 119, 120 are maintained, connected by any suitable means to a stud 121. Two flexible metal plates 122, 123 fixed on supports 124, 125, carry contacts 126, 127 co-operating with the studs 119, 120, see Figs. 9 and 11.

128, 129 designate the end studs enabling the plates 122, 123 to be connected to the relay by means of the studs 152, 153, 154. A part 130 (Figs. 8 and 11) in the shape of a fork and made of insulating material is pivotally mounted on a spindle 131 between the two flexible metal plates 122, 123.

A heart-shaped cam 132 mounted on the shaft 112 is placed between the two arms of the fork 130. A resilient plate 133 fixed at 134 on to spindles integral with the part 118a carries at its upper end, a contact 135 placed so as to face the stud 121.

A sleeve 136 is fixed on the end of the shaft 112 and carries a bushing 137. A ball bearing 138 is mounted on the sleeve 136 and carries an inertia flywheel 139 connected by a pin 140 to a spring 141 anchored to a pin 142 fixed on the bushing 137. The inertia flywheel 139 carries a crown 143 whose lower edge 144 has a double cam 145 against which a rigid plate 146 bears provided with two diametrically opposed nipples 147 engaged in holes drilled in a flange 148 of the sleeve 136. 149 designates insulating parts interposed between the plate 146 and the plate 133.

Figure 12:
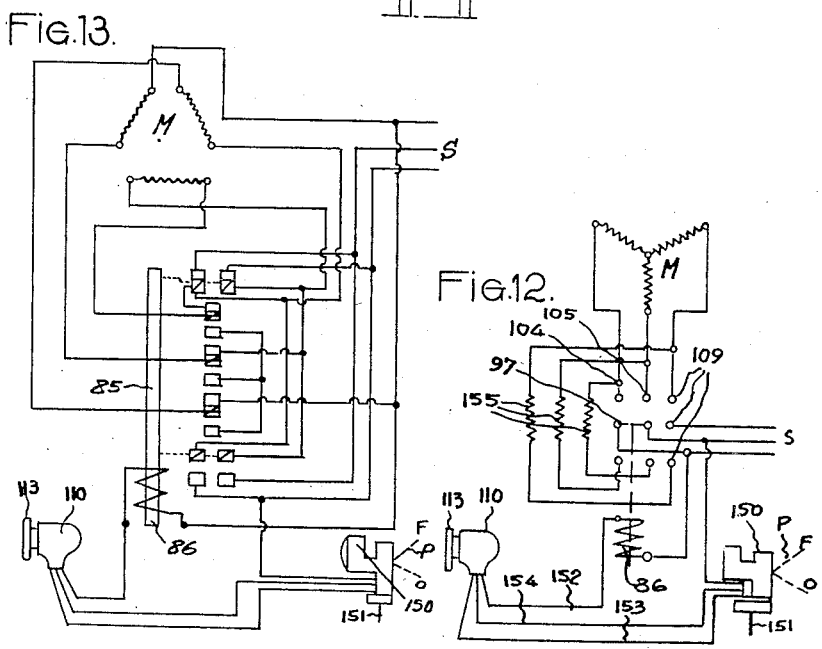
Fig. 12 is an electrical diagram of the wiring of the motor.

In Fig. 12, the motor shown in Fig. 1 is designated by "M." Its lead is a star-shaped lead. The motor is fed with three-phase alternating current from a source S. The phase 1 is directly connected to the motor by the junction box 109, whereas phases 2 and 3 are connected by studs 98, 99 to the contacts 100, 101, 102, 103 of the lagging reverse current relay 86.

When the motor revolves normally, either light, or for driving the pulley 80 at slow speed by means of the reducing gear, or at high speed by means of the clutch element 78 integral with the disc 77, the disc 66, of the clutch element 69 and the crown 70, the relay 86 is not fed and the phases 2 and 3 arrive by the studs 100, 101 at the contacts 104, 105. The rotary casing 17 then revolves at high speed.

Should it be desired to clutch in the sewing machine on the motor, either at low speed or high speed, the pedal P (Figs. 12 or 13) is depressed, for passing from the position F to the position O. This being done, the lever 48 (Fig. 1) is pulled, which rotatively drives the ring 45 and the balls 46 emerge from the cavities 43 of the ring 42.

An axial movement from left to right of the shaft 14 then takes place, which at the same time involves the same movement of the disc 77. The brake element 79 disengages the casing 2 and the clutch element 78 bears against the disc 66. As the latter is driven at low speed by means of the overrunning clutch 72 mounted on the bushing 63, the pulley 80 is driven at low speed by means of the bushing 75. By continuing to pull on the lever 48 to reach the position O of the pedal P, the disc 66 is thrust by means of the disc 77 and the clutch element 78. The clutch element 69 then comes into contact with the ring 70. By means of the bushing 75, the pulley 80 is driven at high speed by the rotary casing 17; the sewing machine runs at its maximum speed. A detailed description of the reduced speed operation, by means of the overrunning clutch 72, is given in applicant's copending application Serial No. 474,750, filed December 13, 1954.

As soon as the pedal P is depressed to bring it from the position F to the position O, the switch 151 opens and no current can reach the selector 110 controlling the electro-magnet 86.

150 designates the positioner switch when enables the direction of the passage of the current in the selector 110 to be reversed, so that the current passes at will either by the contact 126 or by the contact 127 (Fig. 11).

As soon as the pressure exerted on the pedal P is removed, the latter returns from the position O to the position F, and immediately the switch 151 closes. At the same time, the shaft 14 slides from right to left owing to the fact that the balls 46 resume the position shown in Figs. 1 and 3. The double clutch 69, 78 disengages from the rotary casing 17 and the brake 79 bears against the casing 2. The pulley 80 and the sewing machine are abruptly braked and stop. The closing of the switch 151 has the effect of allowing the current to pass to the contact 127 and the stud 120. The abrupt stoppage of the sewing machine also involves the stoppage of the shaft 112, but the inertia flywheel 139 continues, however, to revolve at a certain angle to itself while stretching the spring 141. This movement has the effect of displacing the cams 145 which thrust the plate 146 from right to left. The plate 133 bends over and the contact 135 leaves the stud 121. Thus, no current reaches the electro-magnet 86.

When the force of inertia of the flywheel 139 is absorbed, the spring 141 returns the latter to the position shown in Fig. 8. The plate 146 resumes its position as well as the plate 133. The contact 135 bears against the stud 121. The current then arrives by the conductor 152 at the electro-magnet 86. The latter is excited and influences its movable armature 87 against the action, on the one hand, of the spring 95, and on the other hand, the dash-pot formed by the members 88, 89, 90.

The studs 104, 105 are no longer fed and no current reaches the stator 26. However, the rotary casing 17 continues to revolve owing to its inertia.

As soon as the contacts 102, 103 engage the studs 106, 107, the phases 2 and 3 are reversed and the stator 26, fed in the opposite direction, tends to revolve on itself in the reverse direction to the rotary casing 17. This movement, by driving the ring 29, has the effect of causing the balls 31 to come out of the housing formed by the cavities 30. The balls 31 thrust the part 33 and exert a thrust from left to right, which is transmitted to the parts 37, 38, 40, 42, the balls 46, the ring 45, as far as the shaft 14 which again moves from left to right by a sufficient distance to disengage the brake-element 79 and engage the clutch element 78 on to the disc 66 which revolves at low speed, since the rotation of the rotary casing 17 permanently drives the reducing gear. The pulley 80 revolves while driving the sewing machine.

When the heart-shaped cam 132, integral with the sewing machine by means of the shaft 112, causes the fork 130 to pivot towards the right of the drawing (Fig. 11), the fork 130 presses on the plate 123 and the contact 127 leaves the stud 120. The current no longer reaches the electro-magnet 86, the latter ceases to influence its movable armature 87, and, under the action of the spring 95, this movable armature regains the position shown in Fig. 5. Immediately, the stator 26 no longer tends to revolve in the opposite direction to the rotary casing 17 and resumes its place. The parts 29, 33, 34, 37, 38, 40, 42, 43 the balls 31 and 46 resume the position shown in Fig. 1, the spring 16 again causes the shaft 14 to slide from the right to the left of the drawing (Fig. 1), the brake-element 79 again bears against the casing 2 to stop the pulley 80 and the sewing machine, in this manner.

The return to the position shown in Fig. 5 of the movable armature 87 again allows the normal feed of the stator 26 and the rotary casing 17 again revolves at its normal running speed.

The switch formed by the contact 127 and the stud 120 is in general applied to the top dead centre position of the needle of the sewing machine, whereas the switch formed by the contact 126 and the stud 119 is applied to the permanent circuit stopping the needle at its bottom dead centre. This latter position of the needle is obtained by operating the switch 150 which enables the current to pass by the conductor 153, whereas for the position of the needle at the top dead centre the current passes by the conductor 154 (Fig. 12).

When the stator 26 is fed in the opposite direction to its normal running direction for positioning the needle, its feed takes place through resistances 155 to avoid harmful shocks to the mechanical assembly.

Figure 13:
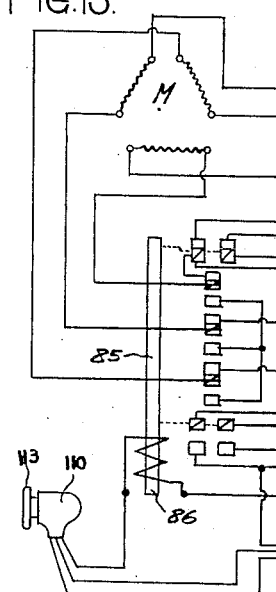
Fig. 13 is an electrical diagram of an alternative wiring of the motor.

Fig. 13 shows the electrical diagram of the wiring of the motor in a triangular star. The working of the motor is then identical to that previously described.

In Fig. 14, the motor, which comprises the same arrangement as Fig. 1, is provided with a stator 26 which is permanently fixed on the hollow spindle 13 without the interposition of the bushing 27.

An electro-magnet 160 is fixed on the body 1 of the motor and its movable armature 161 is pivoted on a shaft 162 mounted on the bearings of the casing 4. 163 designates a recoil device for the movable armature 161. The shaft 162 is integral with a fork 164 whose ends carry rollers 165 bearing against a disc 166 fixed to the ring 29 by means of spurs 167.

A clutch element 168 is fixed on the periphery of the disc 166 for co-operating with a ring 169 fixed, by means of bolts 170, to the rotary casing 17. 171 designates a ball bearing interposed between the bearing 20 carrying the rotary casing 17 and the ring 29.

The motor $M_1$, Figs. 16 and 17, is fed by a source $S_1$ with three-phase alternating current. A selector 110 is mounted at the end of the sewing machine, whereas connection of the motor $M_1$ with the sewing machine is ensured as in the preceding case by means of the pulley 80.

The motor $M_1$ operates as follows:

When the sewing machine is required to be run at low speed (for doing stitch-by-stitch work), a slight pressure is applied to the pedal P (Fig. 16) to pivot it in the direction of the arrow $F_{10}$ (Fig. 16). This movement has the effect of opening the switch 150 and thus no current can pass towards the electro-magnet 160. The movement in the direction of the arrow $F_{10}$ of the pedal P has the effect of causing the shaft 14 to slide from left to right (Fig. 14) and clutch-in the clutch element 78 on the disc 66 driven at low speed from the rotary casing 17 by means of the reducing gear.

If greater pressure is applied to the pedal P, the shaft 14 is again caused to slide from left to right and the clutch element 69 then comes into contact with the ring 70. The pulley 80 drives the sewing machine at high speed.

The movement in the direction of the arrow $F_{10}$ of the pedal P has the effect of attracting the piston 175 of the dash-pot 176 downwards (Figs 16 and 17).

The piston 175 which is attached by the transmission 178 to the pedal P, controls a switch 179 interposed between the two switches 150, 151 and the electro-magnet 160.

When the pedal P is released and regains the position shown in Fig. 16, the switch 150 closes and the current from the source S passing by the selector 110 reaches the switch 179 by means of the conductor 180. The piston 175, by rising slowly, closes the switch 179 after a sufficient lapse of time to allow the sewing machine to stop completely.

As soon as the switch 179 is closed, the current passing by the conductor 181 reaches the electro-magnet 160 which is excited. This electro-magnet influences its armature 161 which pivots in the direction of the arrow $F_{11}$ (Fig. 15). The movement is transmitted, by means of the shaft 162, to the fork 164 carrying rollers 165 which push in the disc 166 up to the moment when the clutch element 168 presses against the ring 169 which is fixed on the rotary casing 17. The disc 166 revolves, and by means of the spurs 167, drives the cam 29, which has the effect of bringing the balls 31 out from their housing and thus to thrust the assembly of the parts 33, 38, 40, 42, 45 from left to right while driving the shaft 14 in this same direction.

The clutch element 78 bears against the disc 66 after the brake-element 79 is disengaged. The slow rotation movement is transmitted to the pulley 80, then to the sewing machine. The selector 110 operates, and when the needle reaches the top dead center, one of the switches of the selector 110 opens and the electro-magnet 160 ceases to be fed.

The movable armature 161 regains the position shown in Fig. 15 under the action of the recoil device 163. The same occurs with the disc 166 carrying the clutch element 168 which again takes up its neutral position shown in Fig. 14. The shaft 14 being no longer impelled by the balls 31 slides from right to left under the action of the spring 16. The brake-element 79 bears against the casing 2 and thus stops the pulley 80 and the sewing machine.

If, instead of the switch 150, the switch 151 is used, the same operations take place, but the needle of the sewing machine stops at its bottom dead center.

A temporizer switch, for example, a switch formed of a twin blade, is mounted in the feed circuit of the coil of the relay 85 so as to delay the passing of the current into this coil and thus keep the relay out of circuit in the event of the motor being accidently stopped in the position selected for the needle, so that when the motor is again fed, to prevent the current from passing into the relay and thus causing a reverse feed for the motor and its abrupt re-starting in the wrong rotation direction.

Figure 18:
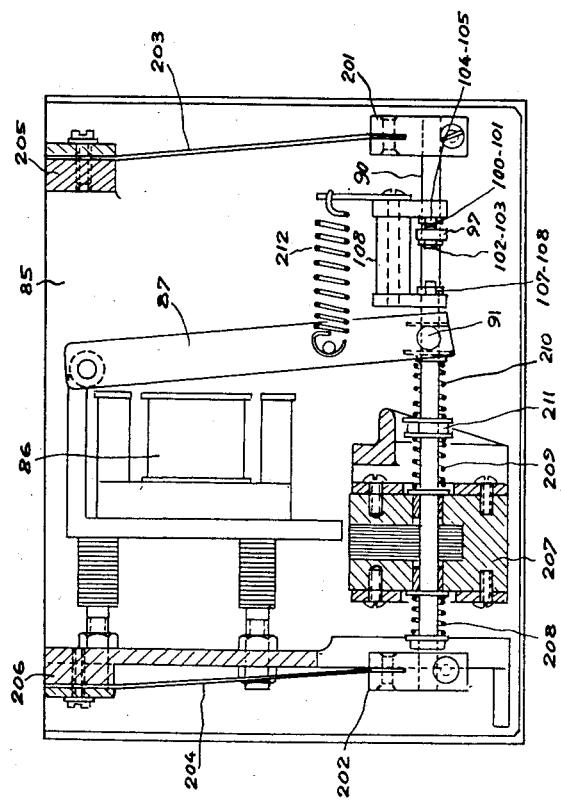
Fig. 18 is a front elevation of an alternative embodiment of the feed relay of the motor.
Figure 19:
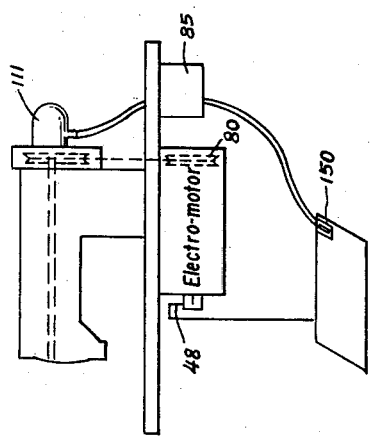
Fig. 19 illustrates the relative location of the unit shown in Fig. 10 to the unit shown in Fig. 1.

In Fig. 18, the rod 90 is mounted in two supports 201 and 202 fixed to the end of two flexible arms 203, 204 fixed to lugs 205, 206 forming part of the panel 85.

The same parts shown in Fig. 5 carry the same reference numerals.

A block 207 is placed on the rod 90 between two balancing springs 208, 209. A third spring 210, placed between the movable armature 87 and a ring 211, enables, when it is compressed by the movable armature 87 to first abruptly disengage the contacts 100, 101 against the action of a spring 212, and then progressively bringing the contacts 102, 103 to engage the studs 107, 108.

The working of this relay is identical to that shown in Figs. 5 and 6.

Various modifications may be applied to the forms of embodiment given by way of examples, without going outside the scope of the invention.

I claim:

1. An electric power system for sewing machines, comprising a casing, a hollow spindle fixed at one end in said casing, a shaft slidably mounted within said hollow spindle for movement between two extreme positions, a single stator on said hollow spindle, a single rotor surrounding said stator and journaled on said hollow spindle, a clutch surface on said rotor, a sewing machine driven member, a brake surface on said casing, first clutch means in said casing between said clutch and brake surfaces, drive means journaled on said shaft in axially fixed relation thereto and extending beyond said casing for connection with the sewing machine driven member, a plate connected with said drive means and disposed within said casing between said rotor clutch surface and said casing brake surface, a brake element on said plate cooperative with said casing brake surface when said shaft is at one extreme position to form brake means to hold said drive means stationary, a clutch element on said plate for cooperation with said rotor clutch surface through said first clutch means when said shaft is slid axially to its other extreme position to form second clutch means to drive said drive means in synchronism with said rotor, reduction gear means in said casing in driving relation with said rotor, an overrunning clutch driven by said reduction gear means, said first clutch means being driven by said overrunning clutch and cooperative with said second clutch means at an intermediate position of said shaft to drive said drive means at a lower speed, means connected with said shaft for displacing said shaft axially, electric circuit means controlling said latter means, and selector means for controlling said electric circuit means.

2. A power system according to claim 1 wherein said electric circuit means comprises a lagging relay and a double contact switch for reversing the current to said stator.

3. A power system as set forth in claim 1, including a pedal, said stator and rotor together forming a motor, an electric circuit feeding said motor, a positioner switch fixed on the pedal for controlling the electric circuit means of the motor, a switch carried by said pedal controlling the circuit to the positioner switch as soon as slight pressure is applied to the pedal, two circuits to the selector means selectively controlling said means said positioner switch controlling the two circuits to the selector means placed on the sewing machine.

4. A power system for a sewing machine according to claim 1, including a ring fastened to the stator, a spring biasing the shaft against axial movement in one direction, means including balls for transmitting sliding movement to the shaft, said ring thrusting the balls so as to bring back the sliding shaft to its first position when the stator ceases to exert pressure on the ring.

5. A power system for a sewing machine according to claim 1, including a bushing adjustably mounted on the hollow spindle, ball bearing means for limiting movement of the bushing in one direction, and means for securely mounting said stator on said bushing.

6. A power system according to claim 2 including an inertia flywheel connected to said sewing machine driven member, a second switch in said circuit means opened by said flywheel for delaying the passage of current between said switch and relay when said flywheel is decelerated.

7. A power system according to claim 2 including a dash pot connected with the armature of said relay for delaying said relay.

8. An electric power system for a sewing machine having a needle comprising a casing, a single motor in said casing including a rotor and stator, a hollow spindle fixed at one end in said casing, a shaft slidably mounted within said hollow spindle, said stator mounted on said spindle for limited rotary movement, said rotor surrounding said stator and journaled on said hollow spindle, clutch means on said rotor, brake means on said casing, drive means journaled on said shaft for connection with a driven member on the sewing machine, electric circuit means for normally energizing the motor to operate the sewing machine, mechanism within the casing in operative relation with said rotor for driving said drive means selectively at high and low speeds, auxiliary circuit means connected with the stator to effect rotary movement of the stator, means within the casing operated by the rotation of the stator to cause an axial movement of the shaft for operating the drive means at a low speed, and means operated upon initial actuation of said brake means to open said auxiliary circuit after a delay and when the drive means is in a predetermined position so as to bring the needle to either its high or low position.

9. An electric power system for sewing machines as set forth in claim 8 wherein the auxiliary circuit means comprises a lagging relay, a double contact switch for reversing the current to the stator, an inertia flywheel supported by the sewing machine and driven by said drive means, and an inertia flywheel operated switch for delaying the passage of current between said double contact switch and relay when said flywheel is decelerated.

10. An electric power system for sewing machines comprising a casing, a hollow spindle fixed at one end in said casing, a shaft slidably mounted within said hollow spindle for movement between two extreme positions, a stator fixed on said hollow spindle, a rotor surrounding said stator and journaled on said hollow spindle, a sewing machine driven member, drive means journaled on said shaft in axially fixed relation thereto and extending beyond said casing for connection with the sewing machine driven member, means in said casing selectively operatively associatable between said drive means and said rotor controlled by axial movement of said shaft to drive said drive means selectively at high and low speed, brake means in said casing actuated by said shaft when the latter is in one extreme position, means connected with said shaft for displacing said shaft axially, electric circuit means controlling the latter means, selector means controlling said electric circuit means, said displacing means including a clutch which cooperates with said rotor, and a fork carried by said clutch to actuate the latter, said electric circuit means including a solenoid controlling said fork, a circuit feeding said solenoid, said circuit being opened by said selector means when the sewing machine driven member is in a preselected position, a control pedal for closing said electric circuit, and a dashpot delaying the closing of the feed circuit of the solenoid.

11. The power system of claim 10 comprising spring means for returning the movable armature of the solenoid to its neutral position when the feed of the solenoid terminates.

References Cited in the file of this patent

FOREIGN PATENTS

| | | |
|---|---|---|
| 509,072 | Belgium | Feb. 29, 1952 |
| 1,030,511 | France | Mar. 11, 1953 |
| 88,740 | Norway | Feb. 11, 1957 |